United States Patent [19]
Ervin et al.

[11] Patent Number: 5,052,715
[45] Date of Patent: Oct. 1, 1991

[54] PASSIVE IMPACT RESTRAINING VEHICULAR STEERING COLUMN ASSEMBLY

[75] Inventors: Paul R. Ervin, Dearborn; Ronald C. Malec, Northville, both of Mich.

[73] Assignee: Ford Motor Company, Dearborn, Mich.

[21] Appl. No.: 495,192

[22] Filed: Mar. 19, 1990

[51] Int. Cl.$^5$ ............................................. B62D 1/18
[52] U.S. Cl. .................................... 280/775; 74/493; 280/777
[58] Field of Search ............... 280/777, 775, 780; 74/492, 493

[56] References Cited

U.S. PATENT DOCUMENTS

| | | | |
|---|---|---|---|
| 3,472,093 | 10/1969 | Tenniswood | 74/492 |
| 3,505,897 | 4/1970 | Scheffler et al. | 74/492 |
| 3,600,971 | 8/1971 | Scarvelis | 74/492 |
| 3,665,777 | 5/1972 | Jensen | 74/492 |
| 3,665,778 | 5/1972 | Bohan et al. | 74/492 |
| 3,669,824 | 10/1972 | Staudenmayer | 74/492 |
| 3,724,286 | 4/1973 | Kitzner et al. | 74/492 |
| 3,760,650 | 9/1973 | Pardy | 74/492 |
| 3,805,636 | 4/1974 | Howes | 74/492 |
| 3,811,337 | 5/1974 | Allison | 74/492 |
| 3,813,960 | 6/1974 | Windett et al. | 74/492 |
| 3,815,437 | 6/1974 | Martin | 74/492 |
| 3,817,118 | 6/1974 | Kitzner et al. | 74/492 |
| 3,832,911 | 9/1974 | Daniel et al. | 74/492 |
| 3,855,876 | 12/1974 | Albrecht et al. | 74/492 |
| 3,868,864 | 3/1975 | Durkee | 74/492 |
| 4,086,825 | 5/1978 | Badcock et al. | 74/492 |
| 4,117,741 | 10/1978 | Yazane et al. | 74/492 |
| 4,273,005 | 6/1981 | Strutt | 74/492 |
| 4,274,299 | 6/1981 | Jones | 74/492 |
| 4,400,990 | 8/1983 | Cook et al. | 74/492 |
| 4,531,760 | 7/1985 | Patzelt | 280/777 |
| 4,616,522 | 10/1986 | White et al. | 74/492 |
| 4,627,306 | 12/1986 | Berenjian | 74/492 |
| 4,703,669 | 11/1987 | Hyodo | 74/492 |
| 4,718,296 | 1/1988 | Hyodo | 280/777 |
| 4,786,076 | 11/1988 | Wierschem | 280/777 |
| 4,838,576 | 6/1989 | Hamasaki et al. | 280/777 |
| 4,915,412 | 4/1990 | Yuzuriha | 280/775 |

FOREIGN PATENT DOCUMENTS

| | | | |
|---|---|---|---|
| 2253658 | 7/1975 | France | 74/492 |
| 57-51574 | 3/1982 | Japan | 280/779 |
| 58-167253 | 3/1983 | Japan | 74/492 |
| 2187144 | 9/1987 | United Kingdom | 74/492 |

Primary Examiner—Charles A. Marmor
Assistant Examiner—Karin Tyson
Attorney, Agent, or Firm—Daniel M. Stock; Clifford L. Sadler

[57] ABSTRACT

A collapsible steering column is mounted to a vehicle by upper and lower bend straps. The bend straps are located such that their energy-absorbing function is not susceptible to interference by intrusion of the dash during front end impact. The steering shaft length is minimized through the use of a break-away coupling located substantially inward of the dash and within the passenger compartment.

19 Claims, 5 Drawing Sheets

PASSIVE IMPACT RESTRAINING VEHICULAR STEERING COLUMN ASSEMBLY

TECHNICAL FIELD

This invention relates to steering column assemblies, particularly for vehicles having a passive impact restraining collapsible system.

BACKGROUND OF THE INVENTION

Collapsible energy absorbing vehicular steering columns for application on vehicle steering systems have been well known and in popular use for a number of years.

One such system includes a unitary steering column member of collapsible construction which extends from steering wheel to dash panel and rotatably supports upper and lower telescopically engaged steering shaft sections. Such a system is shown in U.S. Pat. Nos. 3,760,650, 3,805,636, 3,813,960 and 3,815,437.

Another type system includes a two piece steering column assembly having a lower steering column telescopically received within an upper steering column, each rotatably supporting therewithin respective telescopically engaged upper and lower steering shafts. The upper column is commonly supported at the substructure supporting the instrument panel or dash panel. The lower column generally extends to very near the dash panel or may be attached thereto. The lower steering shaft extends through the dash panel and is secured to the gear box. The energy of an impact at the steering wheel by the occupant is generally taken up by some sort of energy absorbing device which is attached to or part of the upper steering column such as shown in U.S. Pat. Nos. 3,855,876 and 4,273,005, or by the energy absorbing device being operatively associated with each of the upper and lower steering column sections such as shown in U.S. Pat. Nos. 3,665,777 and 3,699,824.

In each case, the system is designed to absorb energy over a prescribed predetermined stroke of the one steering column or steering shaft section relative to the other. This predetermined stroke has been designed on the basis of a forward collapse of the steering column, i.e. in the direction of the occupant moving forward and impacting the steering wheel.

With the development of the newer generation of automobiles has come design criteria affecting the vehicle steering system. Among these is included the shorter front end of the vehicles typical with the most recently aerodynamically designed automobiles. Further, the fact that the engine compartment is filled by the engine and transaxle assemblies and other related engine componetry, there is far less free space in the engine compartment. Thus, during a front end collision particularly, there is an increased possibility that the dash panel will intrude into the passenger compartment to a greater extent than otherwise existed.

Should this occur, the overall design mechanics of the system may be adversely affected in that, when the dash panel intrudes, it will force the lower portion of the lower steering column rearward, taking up the available stroke for absorbing any forward travel of the upper steering column as caused by occupant impact with the steering wheel. In U.S. Pat. Nos. 3,724,286, 3,817,118 and 3,832,911, assigned to the assignee of the present invention, is shown a system wherein the forward end of the steering column is offset from the dash panel and the steering shaft is a cable designed to flex in the event of a front end collision and resultant dash intrusion. However, the steering column itself is displaced forwardly by the impact thus reducing the effectiveness of the design.

Further, the prior art steering column assemblies have not addressed the overall design requirements currently placed on steering assemblies as a total system. For example, in addition to the energy absorbing criteria, the system must be lightweight, free from noise and vibration, both as a source, and as a transmitter of noise and vibration from other parts of the vehicle to the hands of the driver. The design must be sufficiently universal to fit numerous vehicular applications, able to accommodate a tilt wheel feature, simple and straightforward in design concept, and relatively inexpensive.

The present invention addresses the foregoing concerns.

SUMMARY OF THE INVENTION

The present invention contemplates a vehicular steering assembly that is particularly insusceptible to any interference with performance as an occupant collision energy absorbing device by reason of dash intrusion.

More specifically, the present invention includes an energy absorbing axially collapsible passive load restraining vehicular steering assembly having a minimal shaft length extending from the steering wheel to the lowermost portion of the lower steering shaft section telescopically received within the upper steering shaft as coupled to the steering wheel.

The present invention contemplates a vehicular steering assembly wherein the primary steering shaft which is adapted to become completely uncoupled from the remainder of the steering gear box and drive shaft assembly is located substantially inward of the dash and within the passenger compartment, thus presenting a primary steering shaft of minimal shaft length.

The present invention further contemplates the combination of a primary steering shaft of minimal length having a lower section telescopically received relative to an upper section wherein the upper section only includes a steering column body or jacket which in turn is supported to the vehicle substructure by a single mounting bracket capable of absorbing collision energy upon the steering wheel being impacted.

The present invention contemplates a vehicular steering assembly supported from the vehicle body structure in such a manner as to maintain at a minimum noise and vibration that might otherwise be transmitted from the road, for example, through the steering assembly and to the steering wheel.

The present invention contemplates an energy-absorbing vehicular steering assembly which employs a deformable mounting bracket which will accommodate a tiltable steering column.

The invention also contemplates an energy-absorbing mounting bracket in the form of a bend strap having load controlling means whereby energy will be absorbed at a constant rate throughout the duration of any collision impact exceeding a predetermined load sufficient to deform the bend strap.

The upper steering shaft section is rotatably received within an upper steering column body which in turn is supported to the vehicle body structure by a single energy absorbing mounting bracket that provides at least axial and lateral support for the steering assembly and allows the steering assembly to axially collapse upon itself on impact absorbing the impact energy as it collapses.

The lower steering shaft section is not jacketed in any way. The lowermost portion of the lower steering section is located substantially midway of the distance between the dash panel and the steering wheel and is adapted to be uncoupled from the remainder of the steering shaft extending through the dash to the gear box. In the event of a frontal collision, should the dash panel intrude internally within the passenger compartment, the steering shaft becomes uncoupled and can allow any amount of dash intrusion up to the point of contact with the lower end of the lower steering section. At the same time, in the event of driver ridedown or impact with the steering wheel of such magnitude that the passive system is put into play, the normal predetermined collapsed stroke is allowed to accommodate occupant ridedown. Should the frontal collision cause an extreme amount of dash intrusion to the point that the lowermost portion of the lower steering section is impacted, the steering system is designed to allow a certain degree of axial collapse in the direction of the occupant without interfering with the collapse of the steering column from the other direction.

In another embodiment of the invention, the lower steering shaft section is also provided with an axially deformable energy absorbing bend strap affixed to the vehicle substructure. The bend strap is designed to absorb additional impact energy of a forwardly directed impact in the event the predetermined occupant ridedown stroke allowed by the primary bend strap is insufficient to completely absorb impact energy. Thus, in such embodiment, the invention further contemplates an energy-absorbing vehicular steering assembly axially collapsible during a predetermined impact which combines (i) an axially deformable upper mounting bracket for an upper steering column having an upper axially collapsible steering shaft section with (ii) an axially deformable lower bend strap attached to a lower axially collapsible steering shaft section capable of absorbing additional impact energy should the upper and lower steering shaft sections become fully collapsed within one another.

In yet a further embodiment, the primary bend strap is designed in such a manner as to constitute the means by which the steering column is allowed to be manually adjusted by the occupant at various degrees of tilt in the vertical direction to accommodate driver convenience. The bend strap includes a central portion and two radially extending end portions. The central portion is rectangular and adapted to allow the upper steering shaft section to pass through. The butt-end portion of the upper column section is adapted to be clamped to and slidably engaged with the central portion of the bracket such that it is fixed in both the axial and lateral directions but allowed to tilt along a limited arc to adjust the vertical height of the steering wheel.

Other objects, advantages and novel features of the present invention will become apparent from the following detailed description of the invention when considered in conjunction with the accompanying drawings.

BEST MODE FOR CARRYING OUT THE INVENTION

Figure 1:
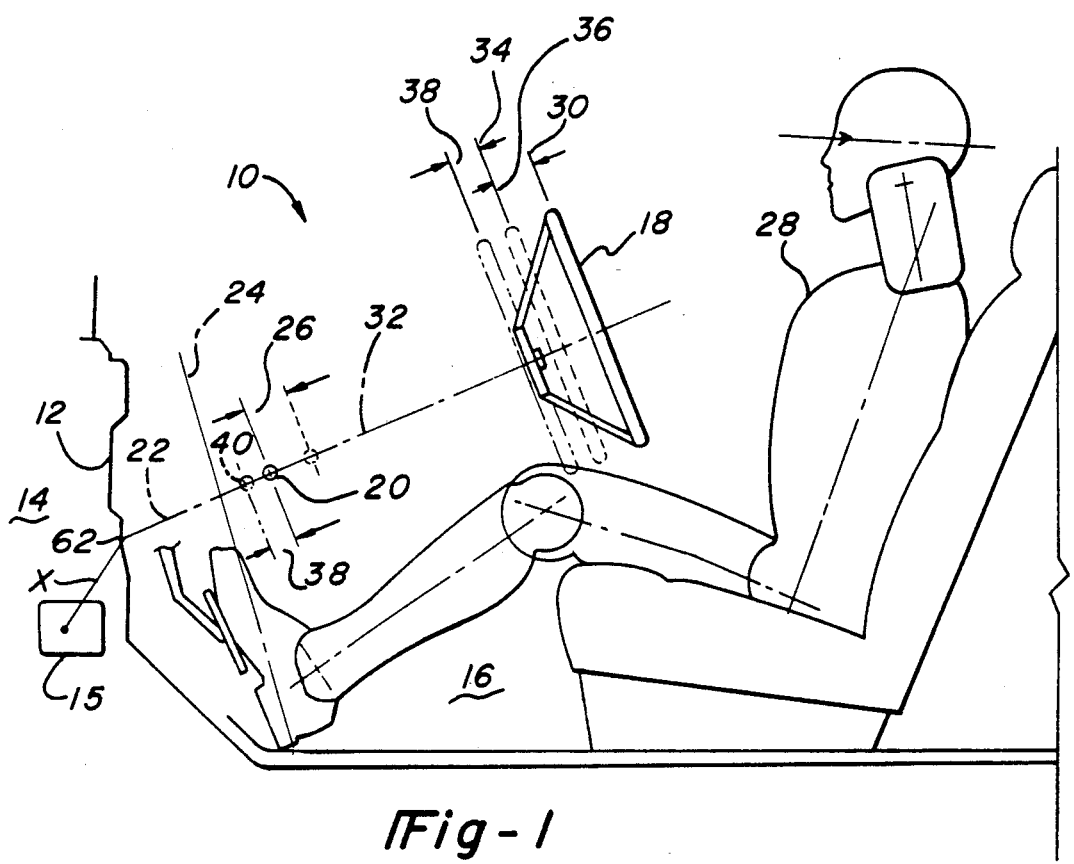
FIG. 1 is a side elevation view of the steering assembly in combination with a vehicle in accordance with the present invention.

The basic features of the present invention are shown most clearly in FIG. 1 wherein a steering assembly generally designated 10 is shown mounted within the interior passenger compartment of a vehicle. A dash panel 12 separates the frontal or engine compartment 14 from the interior passenger compartment 16. A steering wheel 18 is attached to the rearward end of a collapsible steering column assembly described more specifically below which terminates at the lower end of the steering shaft in a coupling 20. The coupling includes a slip-off joint, described below, torsionally connecting the lowermost portion of the steering shaft with a drive connection 22 connected to a steering gear box 15 within the engine compartment 14.

The coupling 20 is located a substantial distance from the dash, approximately midway between the dash and the normal position of the steering wheel 18. The objective is to design the steering shaft length to a minimum and to place it as far rearward of the dash as reasonable in light of other design criteria. In any event, the coupling is located rearward of the design-intrusion line, indicated generally at 24. The design-intrusion line represents the maximum inward travel of the dash panel which may be reasonably anticipated during head-on collisions occurring at a fixed speed and meeting test requirements as may, for example, be established by Federal vehicle safety standards. It will be noted that the coupling 20 is located rearward of the design-intrusion line. Thus, the system is designed for no interference on the steering assembly due to dash intrusion.

As a further design measure, the steering assembly is designed to accommodate dash intrusion beyond the design intrusion line to the point of rearwardly displacing the front end of the lower steering shaft section 32 a predetermined axial distance indicated generally at 26.

During any collision, it is to be anticipated that the occupant indicated generally at 28 will make impact with the steering wheel either directly, or indirectly for those systems equipped with airbags which will expand between the steering wheel and the occupant. In such event, the steering system is designed to axially collapse in the forward direction from an initial position indicated at 30 to a maximum position indicated at 34 thereby traveling a predetermined distance 36. As described below, the upper portion of the axially collapsible steering assembly is equipped with a primary mounting bracket or bend strap capable of absorbing impact energy during occupant ridedown. In the preferred system design, the impact energy will be absorbed completely by the system within the prescribed distance 36.

Should the impact at the steering wheel be particularly severe, the primary mounting bracket is designed to be released from the vehicle substructure or chassis to which it is affixed such that the steering wheel assembly will continue in a forward direction where it will be resisted by the structure of the instrument panel assembly.

In accordance with a further embodiment described in detail below, the lower portion of the lower steering shaft section is provided with a second bend strap which can absorb energy over a predetermined distance 38 as the entire steering assembly moves forward displacing the forward end of the lower steering shaft section from its initial position 20 to a final position 40.

Briefly stated, the general dynamics of the system are as follows.

During slight collisions, the steering assembly will not be affected. The axially collapsible energy absorbing features within the steering assembly are passive and only designed to be utilized if the initial impact load exceeds a certain predetermined amount.

Assuming the predetermined impact load is exceeded, the steering assembly is adapted to collapse a distance 36. At this point, the primary mounting bracket and energy absorbing bend strap 70 will have deformed to the maximum possible extent. Typically, and for purposes of providing an example, this distance may be 100 millimeters (mm), but of course it will vary from application to application.

At the same time, should the collision be a frontal collision causing dash intrusion, the dash intrusion will normally leave unaffected the energy absorbing dynamics of the steering assembly since it will not exceed to the point of contacting the lower end of the lower steering shaft section at point 20.

Should the impact be particularly severe and driver ridedown exceed point 34, the mounting bracket and energy absorbing means 70 is allowed to break free of its support structure, thereby allowing the steering wheel to move forward an additional distance 38 or beyond. If the lower steering shaft section is provided with the second bend strap as shown in the drawings, additional impact energy will be absorbed as the steering column assembly moves forward deforming the second bend strap over the distance 38. For purposes of the example being given, this distance is in the order of 50 mm.

Thus, should circumstances allow that there is no dash intrusion to the point of impacting the steering shaft, the upper steering column assembly and steering wheel can be collapsed a total distance 36 plus 38 which, in the example given, is 150 mm.

Under other circumstances, should dash intrusion proceed to the point of the dash impacting the lower end of the lower steering shaft section, the lower steering shaft section can travel axially rearward and up into the steering column assembly a distance 26 less the extent of forward displacement of the upper steering column and steering wheel assembly.

Figure 2:
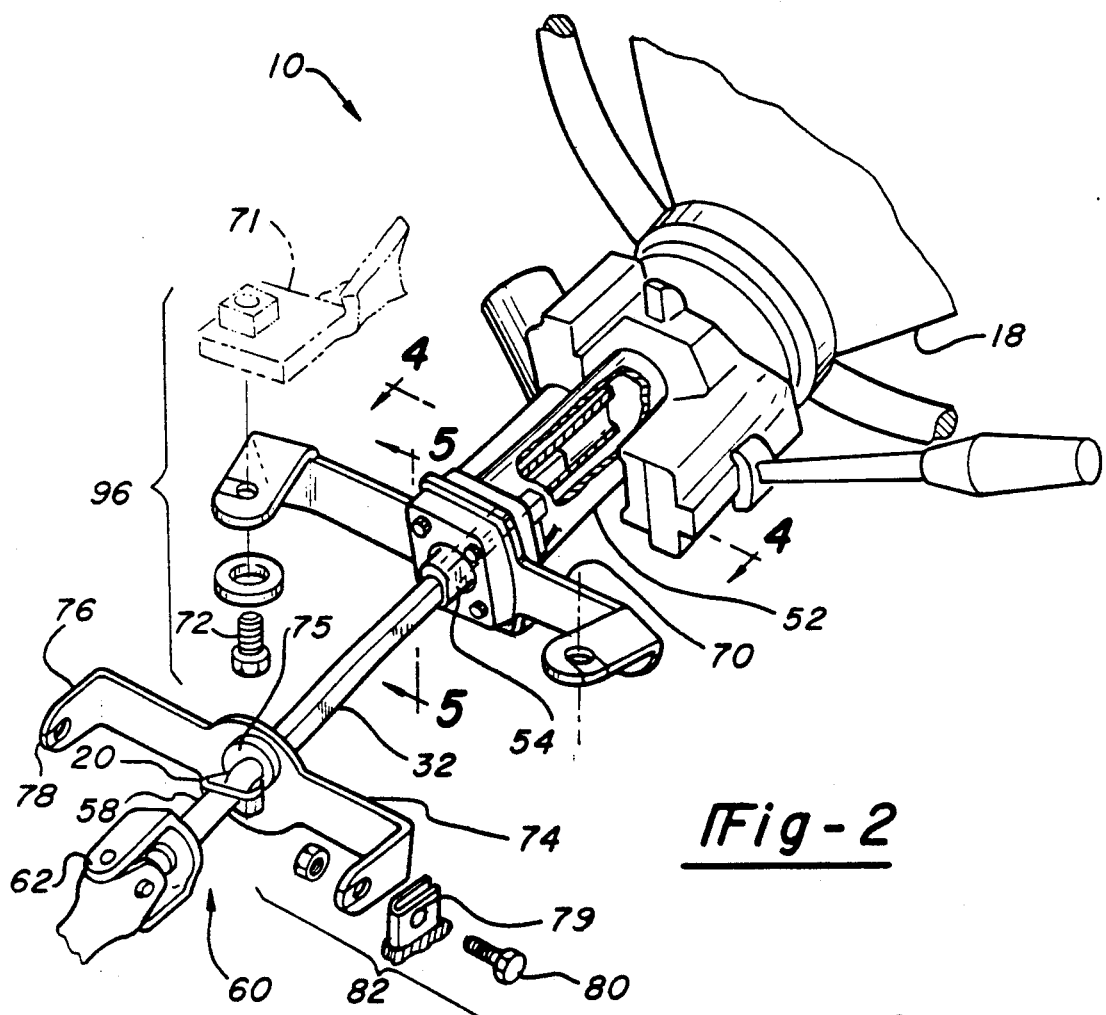
FIG. 2 is a partially exploded perspective view of a steering assembly in accordance with the present invention.

Referring principally to FIG. 2, there is shown a steering assembly 10 having an upper column body 52. An upper steering shaft section 54 extends through and is rotatably supported within upper column body 52. Steering wheel 18 is connected to the upper end of upper steering shaft section 54. Lower steering shaft section 32 is telescopically received within and torsionally engaged with the upper steering shaft section 54, as by providing a D-shaft construction, generally designated as 56 in FIG. 4. At its lower end, it is provided with a slip-off coupling assembly 60, which may be of conventional design not forming a part of the present invention. For example, such a coupling is shown in U.S. Pat. No. 4,086,825 assigned to the assignee of the present invention. The slip-off coupling assembly 60 includes coupling 20, one end of which constitutes the end of lower steering shaft section 32, a stub shaft 58 and a fork 62 for torsionally engaging a third steering shaft section directly extending through the dash panel and connected to the steering gear box 15.

Upper column body 52 is mounted on the vehicle by upper mounting bracket 70 which in turn is affixed at end flanges to the chassis as indicated generally at 71 by bolts 72. In addition to its mounting function, the upper mounting bracket 70 operates as an impact energy absorbing bend strap.

In the embodiment shown in FIG. 2, the mounting bracket 70 and upper column body 52 are designed and affixed to one another in a manner explained in detail below which will allow the steering wheel assembly to be utilized as a manually adjustable tilt wheel. Obviously, as a further embodiment of the present invention, the tilt feature could be eliminated or at least disassociated with the design of mounting bracket 70.

Referring again to the embodiment of FIG. 2, a lower bend strap 74 is provided which is axially and laterally affixed to the lower steering shaft section 32 by a bearing assembly 75 of known configuration so as to allow rotation o the lower steering shaft relative to the bend strap 74. The lower bend strap 74 terminates in end flanges 76 having slip mountings 78 which are in turn affixed to the vehicle by means of bolts 80 passing through respective slip mountings 78 and mounting brackets 79 secured to the vehicle chassis as indicated at 82. An example of these slip mountings can be seen in U.S. Pat. No. 4,274,299 assigned to the assignee of the present invention. The function of the lower bend strap 74 is explained below in detail, but as indicated earlier, its inclusion in the steering system of the present invention is optional. Thus, as another embodiment of the present invention, it could be eliminated all together and the upper mounting bracket 70 would then constitute not only the sole support for the steering column assembly but also the sole energy-absorbing bend strap for the assembly.

Figure 4:
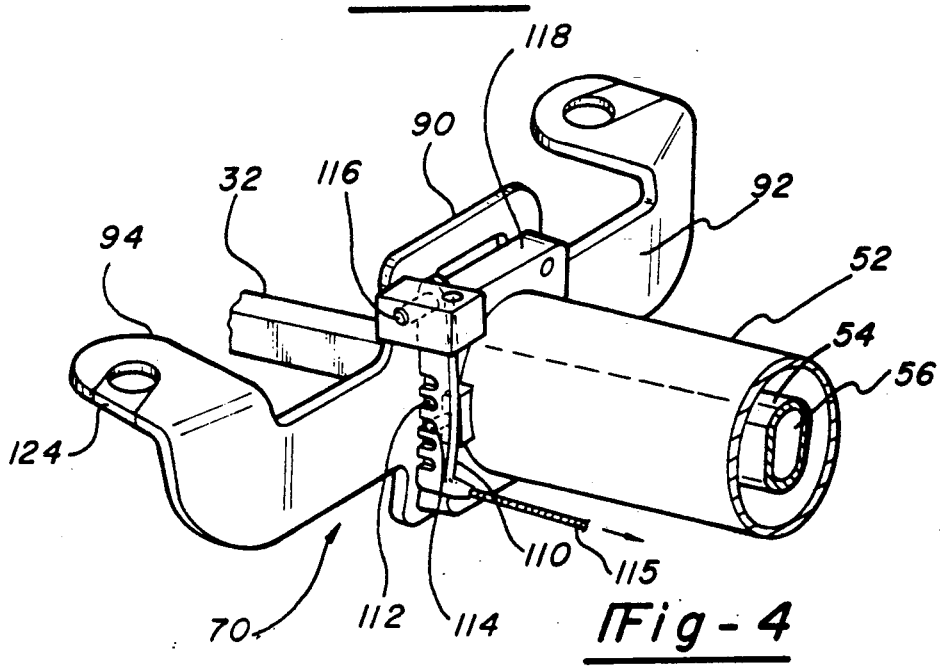
FIG. 4 is a partial perspective view of the upper steering column body taken along section line 4—4 in FIG. 2 and showing primarily the vertical support and tilt mechanism in accordance with the present invention.
Figure 3:
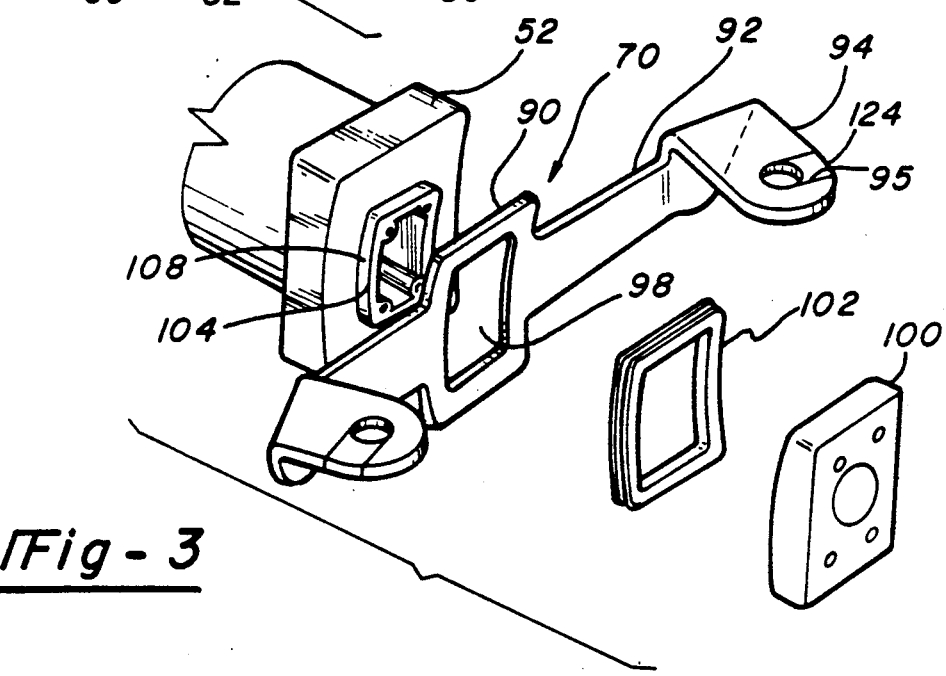
FIG. 3 is an exploded perspective view of the upper bend strap assembly in accordance with the present invention.
Figure 5:
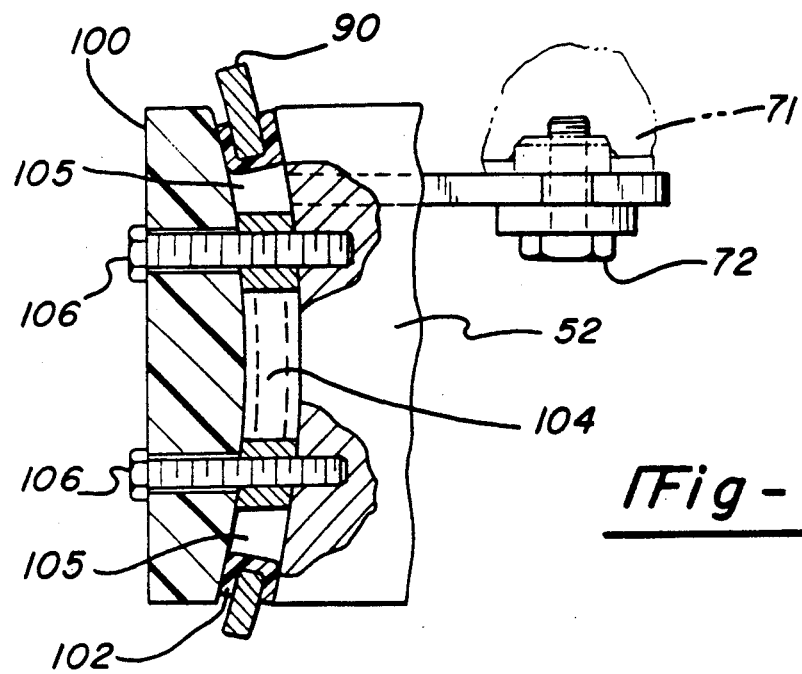
FIG. 5 is a side view of the tilt locking feature taken along section line 5—5 in FIG. 2.

FIGS. 3, 4, and 5 show the details of the primary mounting bracket and energy absorbing member 70. The mounting bracket 70 as shown is designed to allow the steering wheel assembly to be tilted over a limited arc range about a pivot point 20 located generally at the lower end of the lower steering shaft section 32, as seen particularly in FIG. 1. More precisely, the pivot axis is that as established by bolts 80 as the lower bend strap 74 tilts with the entire steering wheel assembly. The upper mounting bracket 70 includes a center portion 90 and two diametrically opposed flanges radially extending from the center portion, each having intermediate flange portion 92. At the end of each intermediate flange portion 92, there is provided an end flange portion 94. Each end flange portion 94 includes a slot 95 extending radially outwardly from the direction of the center portion. Within slots 95 are secured slip mountings 124 described below in greater detail. Bolts 72, shown in FIG. 2, pass through a respective slot 95 to frictionally secure the mounting bracket to the vehicle substructure indicated at 96. The center portion 90 includes a rectangular opening 98 through which the upper steering shaft section extends. The end of the upper column body abuts the mounting bracket on one side and a retaining block 100 abuts the center portion on the opposite side. Each adjoining face of the center portion and upper column and retaining block is curved so as to accommodate the tilt action of the steering wheel. Further, a gasket member 102 having low coefficient of friction and good lubricity characteristics, such as polytetrafluoroethylene, surrounds rectangular opening 98 and is clamped between the respective surfaces of the upper column body 52 and retaining block 100 so as to allow the upper steering column assembly to be tilted with minimal frictional resistance.

Four bolts 106 are seen to extend through the retaining block 100 to engage the upper column body and clamp it to the mounting bracket 70. These bolts pass through the rectangular opening 98 of the upper mounting bracket but do not engage any portion of the mounting bracket.

To restrain lateral movement of the upper column body 52 relative to the mounting bracket 70, a rectangular collar 104 is provided at the end of the upper column body. Collar 104 extends within rectangular opening 98 and the vertical sides 108 thereof slidingly engage the gasket 102.

The extent to which the steering column may tilt is determined by the difference in height between collar 104 and that of the opening 98 in upper mounting bracket 70 as represented by the gap 105, shown in FIG. 5.

Referring principally to FIG. 4, the steering wheel and upper column body are designed to be held in any one of several selected positions within the tilt range by pawl 110 having a plurality of locking grooves 112 and being biased by a spring (not shown) in a direction engaging a pin 114 in any one of the locking grooves. The pin 114 is fixed to the upper column body 52. The pawl 110 is fixed to and pivots about pin 116 which in turn is fixed to a mounting block 118 representing the same vehicle chassis substructure to which the end flanges of the mounting brackets 70 and 74 are affixed. This provides a solid foundation for carrying the vertical load of the steering wheel assembly. It also eliminates noise and vibration that would otherwise be transferred through, and amplified by, the mounting bracket, were the mounting bracket to be the sole vertical support means for the steering wheel assembly. The pawl is released from the mounting pin 114 by a conventional manually operated tilt lever (not shown) pulling against a cable 115.

When the steering column is tilted, retaining block 100 and upper column body 52 also tilt. Upper mounting bracket 70, however, remains stationary. Gasket 102 reduces the friction which would otherwise impede this movement.

Figure 6:
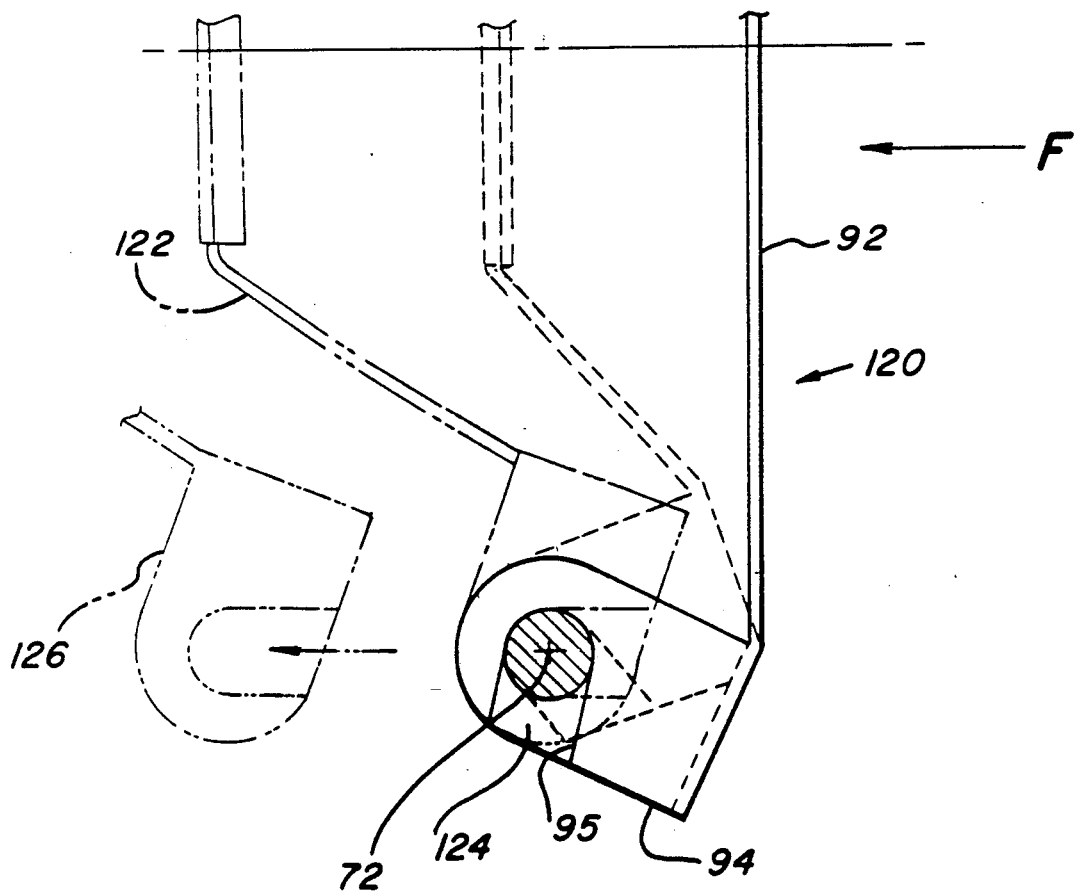
FIG. 6 is a top elevational view of the upper bend strap in accordance with the present invention partly in section at the pivot to show the bend strap before deformation in solid line and after deformation in phantom.

FIG. 6 shows the initial and normal position 120 of the upper mounting bracket in solid line. In the event of a collision at an impact load exceeding that at which the bend strap is designed to yield, the steering column body 52 will collapse as the bend strap deforms in the direction of force arrow F. Simultaneously, end flange 94 frictionally pivots in a counterclockwise direction about an axis defined by bolt 72 through the positions shown in phantom until reaching its final position 122 at which time the center portion 90 and steering column body 52 will have traversed the distance 36 referred to in FIG. 1. Should occupant ridedown not have been completely arrested, the end flange portions 94 will slip out from bolts 72 upon release of slip mountings 124 to the position shown at 126.

Figure 7:
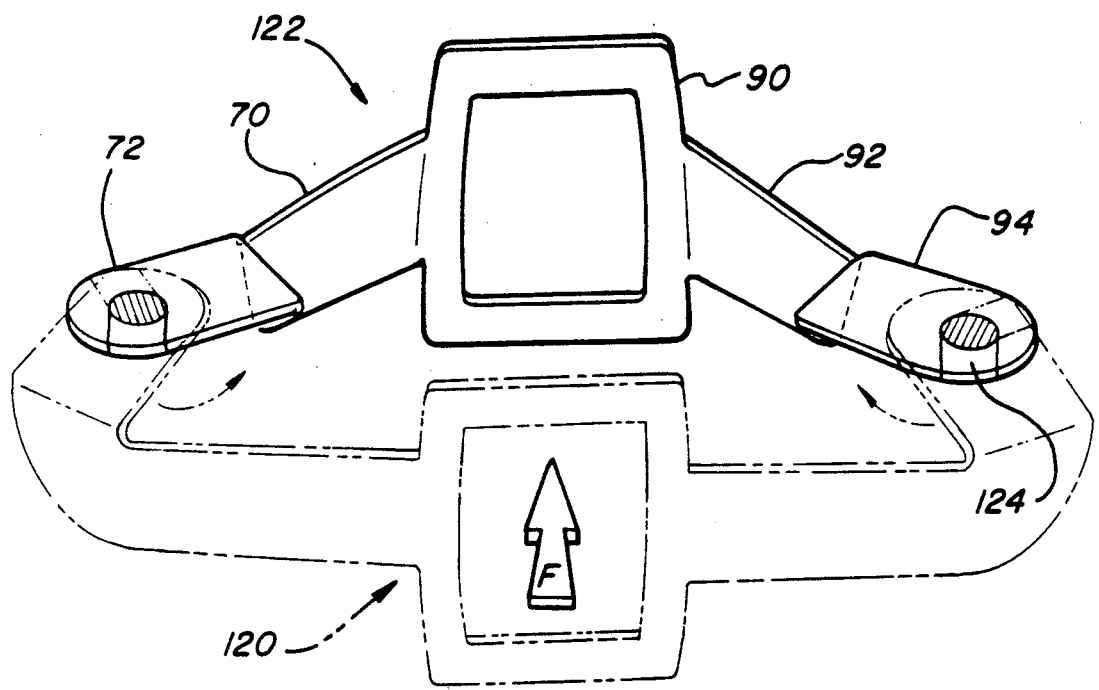
FIG. 7 is a perspective view of the upper bend strap of the present invention in initial (phantom line) and fully deformed (solid line) configuration.

FIG. 7 shows the upper mounting bracket 70 after a full stroke in solid line. A force in the direction of arrow F causes this change from the initial position 120 shown in phantom to the fully extended position 122.

As can be seen from both FIGS. 6 and 7, as a steering column assembly is axially collapsed throughout the predetermined distance 36, the mounting bracket is constantly deforming by bending at the juncture of the intermediate flanges 92 with the center portion 90 at one end and the end flange 94 at the other end. It is important that this bending at these junctures be facilitated in a controlled manner. For this purpose, each juncture is formed of reduced cross-sectional area relative to the remainder of the intermediate flange. This reduction in cross-section can be accomplished, for example, by providing the flange with a hole at the juncture of the intermediate flange with the end flange. It is not necessary that a similar load controlling feature be provided at the juncture with the center portion since the clamping of the flange at the center portion between the retaining block and upper steering column body constitutes such a change in cross-sectional thickness. Thus, bending can only be allowed along a vertical plane extending down the sides of the retaining block.

It will be further noted that as the bend strap is deformed over the distance 36, the end flange rotates about the vertical axis provided by bolt 72 to a point where the slot 124 is axially aligned with the steering shaft. Consequently, any further travel of the upper steering column body and steering wheel assembly beyond the distance 36 will be allowed by virtue of the end flange being pulled free of the bolt 72. This is shown in the end flange position 126 indicated in FIG. 6 in dotted line.

Figure 8:
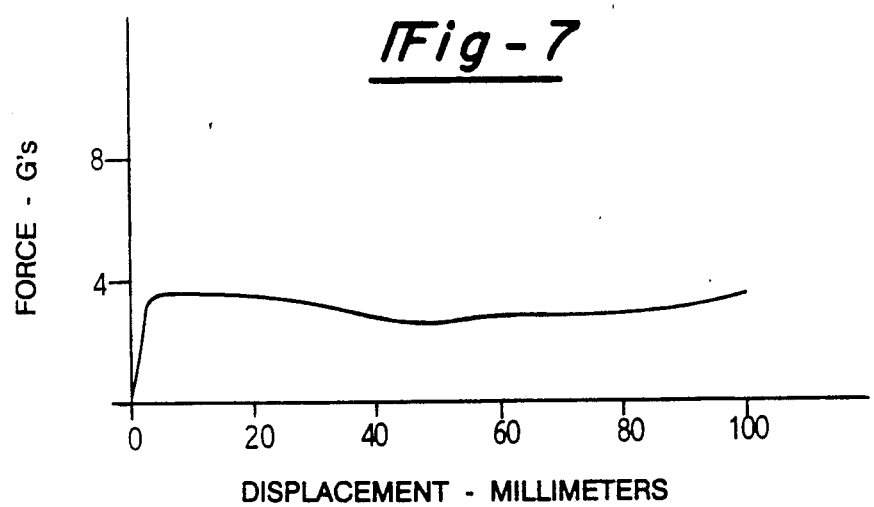
FIG. 8 is a graph of impact load versus upper bend strap displacement in accordance with the present invention.

A graph of displacement of the upper mounting bracket (in millimeters) as the steering column collapses versus force (in G's) is shown in FIG. 8.

As can be seen, the curve is essentially flat. An absolutely flat curve, known as a square wave, denotes deformation at every point under the same load. The square wave is ideal because it indicates a constant rate of energy absorption and avoidance of any undesirable buildup of force.

Figure 9:
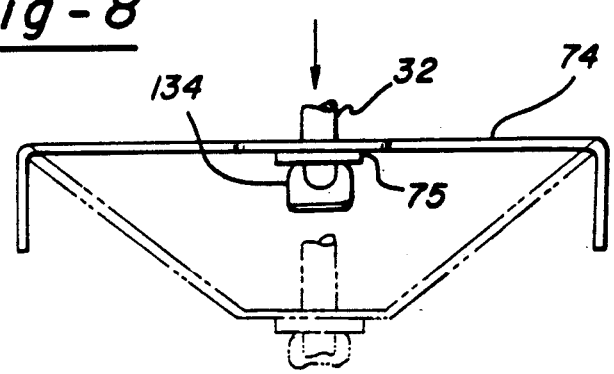
FIG. 9 is a partial plan view of the lower bend strap assembly in accordance with the present invention.

FIG. 9 shows lower bend strap 74 in greater detail. Lower steering shaft section 32 is connected to the lower bend strap by a bearing arrangement 75 of common type which allows rotational movement but precludes axial displacement of the lower steering shaft section 32 relative to bend strap 74.

This lower bend strap 74 absorbs energy when the lower steering shaft section 32 is driven forward by deforming as shown in dotted line. When the steering column collapses to the point that the primary bend strap 70 is fully extended and then released, the lower bend strap 74 provides an additional means of absorbing impact energy. If the lower steering shaft 32 is driven in the opposite direction, i.e., toward the driver, the lower bend strap 74 disengages from the vehicle via slots and slip clamps as described earlier.

To accommodate the steering wheel being tilted as above-described, the lower bend strap 74 rotates about the axis defined by the bolts 80 as the steering column tilts.

In the event of a vehicle front-end impact, the invention operates as follows. Upon impact, the driver occupant will have a tendency to continue in the forward direction toward the steering wheel 18.

If the impact is of sufficient magnitude, the occupant's forward motion will continue until arrested by a seat belt or the steering wheel, in the latter case either directly or indirectly by intervention of an expanded air bag type device.

If the force of the impact transmitted through steering wheel 18 to the upper column body 52 exceeds a predetermined value, the upper mounting bracket 70 will begin to pivot and deform. Energy is then dissipated through both the friction of the pivoting and bending of the upper mounting bracket.

As this occurs, the upper steering shaft section 54 suspended within the upper column body 52 telescopically axially collapses relative to the lower steering shaft section 32. If the lower steering shaft section 32 is not driven in the opposite direction, as might occur in the event of severe dash intrusion, the upper mounting bracket 70 can bend to its designed displacement, approximately 100 millimeters in the given example.

When the upper mounting bracket 70 reaches its fully extended position, it breaks away and the lower bend strap 74 begins to absorb energy by deformation. If there is no dash intrusion, the lower bend strap will provide an additional stroke, e.g. for purposes of this particular example, 50 millimeters. Thus, the maximum stroke of the steering column is increased e.g., to approximately 150 millimeters.

Figure 10:
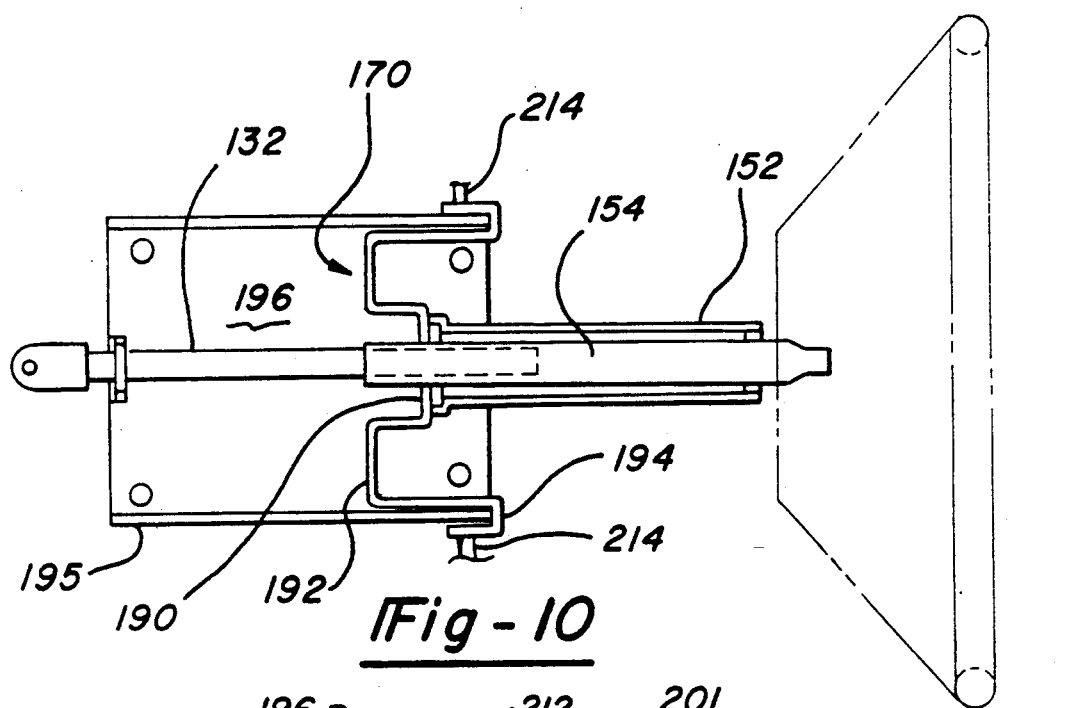
FIG. 10 is a plan view of an alternative embodiment of the present invention.
Figure 11:
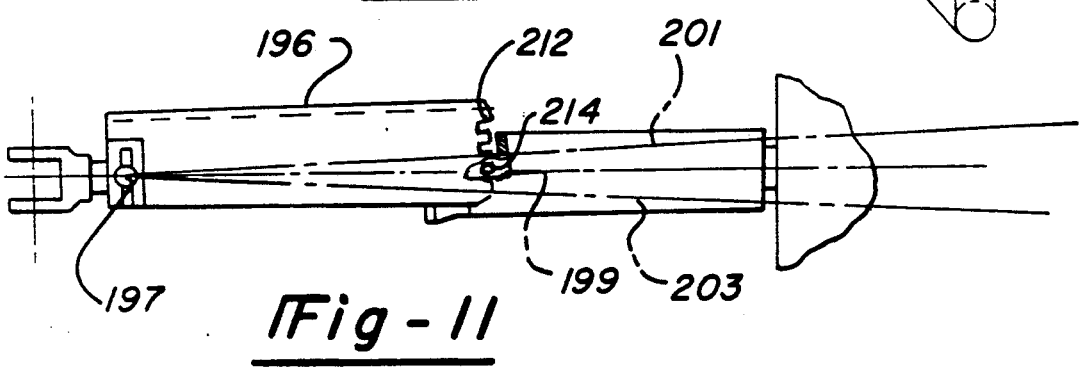
FIG. 11 is a side view of the alternative embodiment of the present invention showing the tilt feature.
Figure 12:
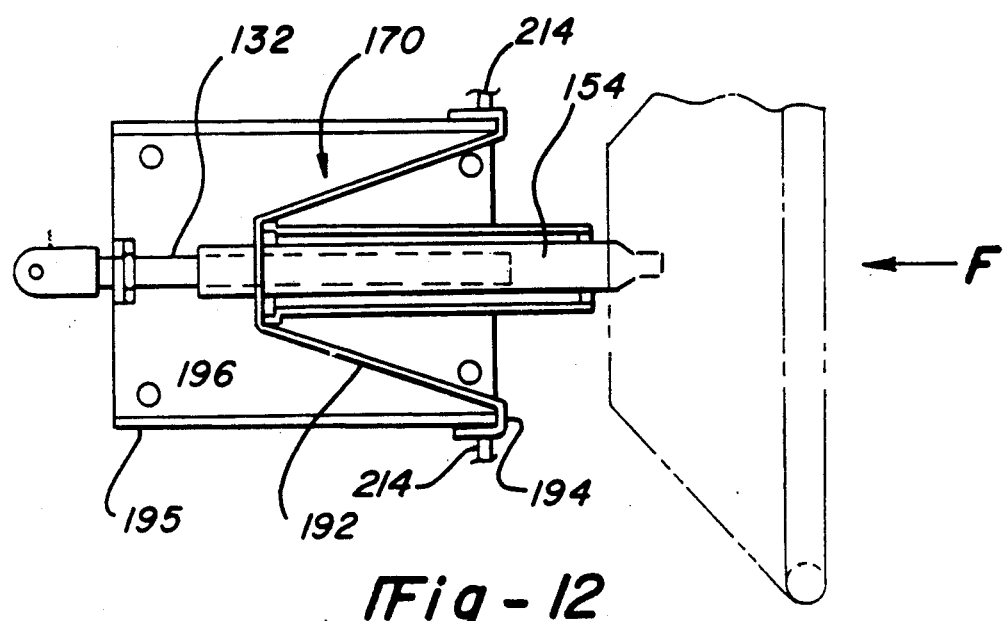
FIG. 12 is a plan view of the alternative embodiment of the present invention showing the bend strap fully extended.

An alternative mode is shown in FIGS. 10–12 wherein like components are given like reference numeral plus 100.

FIG. 10 shows the initial configuration of the alternative embodiment. The upper steering shaft section 154 extends through and is rotatably suspended within upper column body 152. Lower steering shaft section 132 is telescopically engaged with upper steering shaft section 154. The upper column body 152 is mounted to the vehicle by mounting bracket 170. The mounting bracket 170 comprises center portion 190, intermediate flanges 192, and end flanges 194. The end flanges 194 are folded over to provide end flange portions which are U-shaped in the plan view as shown. End flanges 194 are adjustably attached to mounting bars 195 which are integral flanges extending upright from a common base plate 196, which is in turn affixed to the vehicle chassis in a manner not shown but similar to that of the first described embodiment.

To provide for manually adjusting the degree of tilt, the end of each flange 195 includes locking grooves 212.

A spring loaded, manually retractable lock pin 214 extends through each flange 195 and into any one of the locking grooves 212.

Upon retracting the lock pins 214 from a respective pair of locking grooves 212, the operator may select any other steering wheel height within the allowed tilt range and then release the locking pins to engage a second pair of locking grooves 212, thereby securing the steering column body 154 at its new position.

FIG. 11 shows the range of tilt for the steering column. The steering column has a pivot point 197 about which the column tilts. The column tilts from center axis 199 between an upper limit 201 and a lower limit 203. The size of this range of tilt is a function of the length of the column and the dimensions of the center portion 190 of the mounting bracket 170.

The mounting bracket 170 is shown fully extended after impact in FIG. 12. Upper steering shaft section 154 has telescopically engaged lower steering shaft section 132, and the intermediate flanges 192 of the mounting bracket 170 have straightened while absorbing the impact energy. End flanges 194 have remained attached to the mounting bars 195.

It will also be understood that while the form of the invention herein shown and described constitutes a preferred embodiment of the invention, it is not intended to illustrate all possible forms thereof. It will also be understood that the words used are words of description rather than limitation, and various changes may be made without departing form the spirit and scope of the invention disclosed.

We claim:

1. In combination, a vehicle chassis having a dash panel dividing a frontal compartment from an interior passenger compartment, and a steering assembly within said passenger compartment;
   said steering assembly comprising a steering wheel, a steering shaft having an upper shaft section connected to said steering wheel and a lower shaft section, one said shaft section being telescopically received over a first distance and axially collapsible within the other for a predetermined total stroke;
   an upper column body, said upper column body encompassing said upper shaft section and extending to said steering wheel, said upper column body having a length substantially equal to the total length of said first distance and said predetermined stroke;
   said upper shaft section being rotatably suspended within and axially secured to said upper column body, and terminating at the lower end thereof;
   said lower shaft section extending beyond said upper shaft section a distance substantially equal to said predetermined stroke;
   a primary mounting bracket means for supporting said upper column body to said vehicle chassis;
   said bracket means including means for allowing said upper column body and upper shaft section to axially collapse in a forward direction toward said frontal compartment upon receiving a predetermined impact load in the direction of said frontal compartment at a substantially constant rate and over a predetermined distance, thereby absorbing impact energy over said predetermined distance to bring the assembly to rest;
   coupling means at the lower end of said lower shaft section for rotatably connecting the lower shaft section to a steering means within said frontal compartment;

said coupling means being adapted to uncouple said lower shaft section upon a predetermined relative axial displacement between said lower shaft section and the steering means in the direction of said steering wheel;

the lower end of said lower shaft section being disposed substantially rearward of the dash panel about midway between the dash panel and said steering wheel whereby a substantial degree of dash panel intrusion can be accommodated during a frontal collision without impacting in any way the steering assembly.

2. The combination of claim 1 wherein said bracket means includes a central portion and a pair of diametrically opposed flanges extending radially outwardly therefrom and including a pivot means at each end portion thereof for frictionally securing said mounting bracket to said vehicle chassis, said upper steering column body being affixed to said bracket means at said central portion.

3. The combination of claim 2 wherein said end portion is offset from said flange and said pivot means is adapted to allow
(i) said end portion to rotate about a substantially vertical axis upon receiving said predetermined impact load; and
(ii) said flange to deform relative to said pivot means and said central portion over said predetermined distance.

4. The combination of claim 3 wherein each said flange includes at each end thereof, joining said pivot means and said central portion load controlling means for allowing that the point of deformation of said bracket means will be primarily at the juncture of said flange with the remainder of said bracket means.

5. The combination of claim 4 wherein each said pivot means includes an axially forwardly directed end flange portion, each said end flange including a slot directed radially outwardly from said bracket means whereby as the said center portion of the bracket means axially collapses with the upper column body, each said end flange will pivot about said vertical axis until said slot shall become aligned with the axis of the collapsing upper column body and whereby upon the upper column body being collapsed the full extent of said predetermined distance, said slot shall pass through said vertical axis to release upper column body from said vehicle chassis.

6. The combination-on of claim 5 wherein said load controlling means includes the said intermediate flange being reduced in cross-sectional area at the juncture with said end flange and central portion.

7. The combination of claim 2 wherein said central portion of said bracket means includes a generally rectangular opening bounded by substantially vertical side surfaces;
said upper column body being received within said rectangular opening and supported thereby in fixed relative position axially and laterally.

8. The combination of claim 7 wherein said steering assembly includes a manually adjustable tilt mechanism means for allowing the steering wheel to be adjusted to various heights along a prescribed limited vertical extent, said tilt mechanism means including said upper column boc ... said bracket means and vertical locking support means affixed to said vehicle chassis.

9. The combination of claim 8 wherein said central portion of said bracket means includes a laterally disposed surface having a radius of curvature of a predetermined arc length and having its center point at said lower end of said lower shaft section;
the lower end of said upper column body terminating in a similarly curved surface;
said upper column body including a retaining means for maintaining the lower end of said upper column body in constant abutting engagement with said lateral surface; and
said vertical locking support means being adapted to be released manually at will whereupon the position of said upper column body may be adjusted to any vertical extent throughout said arc length.

10. The combination of claim 9 wherein said locking support means includes a retaining pin member and a pawl member having a plurality of slots for receiving said pin member to thereby adjust the height of said upper column body and steering wheel;
said pin member and pawl member being manually releasable relative to one another, and one of said members being affixed to said upper column body and the other to said vehicle chassis whereby the vertical support for said steering assembly is through said vehicle chassis and noise and vibration attenuation through said bracket means is substantially eliminated.

11. The combination of claim 1 further including:
second bracket means for absorbing energy upon said steering column assembly receiving an impact load in excess of said predetermined impact load in the direction of said frontal compartment;
said second bracket means being axially affixed to said lower shaft section and to said vehicle chassis;
said second bracket means being deformed to thereby absorb said impact upon said upper and lower steering shaft sections becoming substantially fully axially collapsed relative to one another over said predetermined distance.

12. The combination of claim 11 wherein said second bracket means includes slip means for allowing the entire second bracket means to come free of the vehicle chassis if impacted in the rearward direction by said dash panel at a predetermined impact load;
said lower steering shaft section thereby being allowed to axially collapse relative to said upper steering shaft section a second predetermined distance without impeding any forwardly directly axial collapse of said upper steering shaft section.

13. An energy-absorbing steering column exposable to a predetermined impact load and mountable within a vehicle comprising:
an upper column body;
a steering shaft rotatably suspended within and extending through said upper column body;
said steering shaft comprising an upper steering shaft section and a lower steering shaft section, said steering shaft sections being arranged from telescopic movement relative to one another in response to said predetermined impact load;
first bracket means for mounting said steering column to the vehicle and for absorbing energy upon said predetermined impact load, said bracket means comprising a center portion adapted to circumscribe said steering shaft in a manner to facilitate the tilting of said steering shaft with respect to the vehicle before said impact and at least one intermediate flange extending generally outwardly from said center portion to be connected to the vehicle;

a retaining block connected to said upper column body for securing said bracket means to said upper column body and movable relative to said bracket means with said upper column body when said steering shaft is tilting; and second bracket means deformable for absorbing energy upon said predetermined impact load comprising a center portion affixed to said lower steering shaft section and having at least one radially extending portion including an end portion adapted to be fixed to the vehicle;

whereby upon said steering column being impacted at a load above said predetermined impact load, said upper steering shaft section collapses axially with respect to said lower steering shaft section as said intermediate flange and said second bracket means yield in bending deformation.

14. The energy-absorbing steering column of claim 13 wherein the vehicle has a dash panel which may intrude within the vehicle interior in response to a second predetermined impact load, and wherein said end portion of said second bracket means includes a one-way breakaway coupling means for allowing said second bracket means to break free from said vehicle upon intrusion of said dash panel.

15. In combination with a vehicle having a dash panel, an energy-absorbing steering column in said vehicle and exposable to a predetermined impact load in the event said vehicle is involved in a collision, said steering column comprising:

an upper column body;

a steering shaft rotatably suspended within and extending through said upper column body;

said steering shaft comprising an upper steering shaft section and a lower steering shaft section, said steering shaft sections being arranged for telescopic movement relative to one another in response to said predetermined impact load;

a steering wheel connected to said upper steering shaft section at the upper free end thereof;

bracket means for mounting said steering column to said vehicle and for absorbing energy upon receiving said predetermined impact load, said bracket means comprising a center portion adapted to circumscribe said steering shaft in a manner to facilitate the tilting of said steering shaft with respect to said vehicle and at least one flange portion extending generally outwardly from said center portion and connected to said vehicle; and a locking block connected to said upper column body for axially and laterally securing said bracket means to said upper column body, said upper column body and steering shaft being movable relative to said bracket means along a generally vertical axis of limited arc length to facilitate manually adjusting the height of said steering wheel; and means for vertically supporting said upper column body and steering shaft in any one of a plurality of positions within said limited arc length and independent of said bracket means.

16. An energy-absorbing steering column exposable to an impact load and mountable within a vehicle comprising:

an upper column body;

a steering shaft rotatably suspended within and extending through said upper column body;

said steering shaft comprising an upper steering shaft section and a lower steering shaft section, said steering shaft sections being arranged for telescopic movement of predetermined limited stroke relative to one another in response to said predetermined impact load;

first bracket means for mounting said steering column to said vehicle and for absorbing by bending deformation the energy of said impact load at a substantially fixed rate over a substantial portion of said limited stroke;

second bracket means connected to the lower end of said lower steering shaft section deformable for absorbing by bending deformation the energy of said impact load over the remaining portion of said limited stroke.

17. In combination with a vehicle having a dash panel, an energy-absorbing steering column in said vehicle and exposable to a predetermined impact load in the event said vehicle is involved in a collision, said steering column comprising:

an upper column body;

a steering shaft rotatably suspended within and extending through said upper column body;

said steering shaft comprising an upper steering shaft section and a lower steering shaft section, said steering shaft sections being arranged for telescopic movement relative to one another in response to said predetermined impact load;

a steering wheel connected to said upper steering shaft section at the upper free end thereof;

bracket means for mounting said steering column to said vehicle and for absorbing energy upon receiving said predetermined impact load, said bracket means including a bend strap member having a center portion affixed to said steering shaft and a pair of diametrically opposed flange portions extending generally outwardly from said center portion; and each said flange portion including an end flange portion having means for supporting and adjustably suspending said upper column body at any one of a plurality of vertical positions within a limited range.

18. The invention of claim 17, wherein said bracket means further includes a mounting base plate member and end flanges at each side thereof extending parallel to the axis of said steering column;

each said end flange portion of said bend strap being U-shaped in plan view and straddling a respective end flange of said base plate member whereby the steering column body will be restrained from moving forward; and a manually retractable locking means extending through each said end flange portion and base plate member end flange whereby the upper column body and bend strap may be released from from the base plate member to adjust the height of the steering column.

19. The invention of claim 18, wherein each said base plate member end flange includes a plurality of locking grooves at one end thereof; and each said end flange portion of the bend strap includes a manually retractable locking pin adapted to interengage any one of said locking grooves.

* * * * *